United States Patent [19]

Yasue

[11] Patent Number: 5,043,148

[45] Date of Patent: Aug. 27, 1991

[54] TRANSFER DEVICE

[75] Inventor: Takao Yasue, Itami, Japan

[73] Assignee: Mitsubishi Denki Kabushiki Kaisha, Japan

[21] Appl. No.: 230,411

[22] Filed: Aug. 10, 1988

[30] Foreign Application Priority Data

Feb. 8, 1988 [JP] Japan ................................. 63-25684

[51] Int. Cl.$^5$ ............................................. B01D 53/04
[52] U.S. Cl. ................................... 436/174; 422/292;
422/295; 422/296; 62/55.5; 436/174; 55/75;
55/389
[58] Field of Search ................ 422/28, 26, 25, 292,
422/295, 296, 288; 55/389, 75, 387; 62/55.5,
268, 269, 46.1; 417/901; 436/174

[56] References Cited

U.S. PATENT DOCUMENTS 4,546,613  10/1985  Eacobacci et al. ................. 62/55.5
4,577,465   3/1986  Olsen et al. ......................... 55/269
4,860,549   8/1989  Harvell et al. ..................... 417/901

FOREIGN PATENT DOCUMENTS 63-154870  6/1988  Japan ................................ 62/55.5

OTHER PUBLICATIONS

The Condensed Chemical Dictionary, p. 733, Van Nostrand Reinhold Co.

*Primary Examiner*—David L. Lacey
*Assistant Examiner*—Abanti B. Singla
*Attorney, Agent, or Firm*—Leydig, Voit & Mayer

[57] ABSTRACT

A transfer vessel for transporting a specimen between two vacuum apparatuses while maintaining the specimen under a high vacuum. The device has a hermetic container for accommodating a specimen removed from a vacuum apparatus and for supporting the specimen. A pressure reducing device reduces the pressure in the hermetic container by adsorbing a gaseous matter contained therein.

11 Claims, 2 Drawing Sheets

TRANSFER DEVICE

BACKGROUND OF THE INVENTION

1. Field of the Invention

The present invention relates to a transfer vessel for transferring a specimen between two vacuum apparatuses while maintaining the specimen under a high vacuum. The invention is also concerned with a method of transfer using the device.

2. Description of the Related Art

In general, when a specimen which has been subjected to various kinds of treatment in a vacuum apparatus having a high or medium degree of vacuum is temporarily removed from that apparatus and is then accommodated again in that apparatus or in another vacuum apparatus, it is often necessary to transport the specimen without exposing it to the atmosphere, while maintaining it under vacuum. Hitherto, a transfer device, such as the one shown in FIG. 2, has been used to meet this requirement. This transfer device has a container body 1, a coupling portion 2 provided at a lower portion of the container body 1 adapted to be selectively opened or closed, and a vacuum pump 4 constituted by an ion pump or the like hermetically connected to a side portion of the container body 1 via a connecting portion 3. In operation, the coupling portion 2 is hermetically coupled to a vacuum apparatus (not shown) with the coupling portion 2 closed. At the same time, the inside of the container body 1 is evacuated so as to maintain it at a high or medium degree of vacuum. In this state, the coupling portion 2 is opened and a specimen 5 is transferred from the vacuum apparatus to the inside of the container body 1. After the specimen 5 has been supported by a holder 6 which is installed on an inner wall of the container body 1, the coupling portion 2 is closed. Subsequently, the coupling portion 2 is either opened and the specimen 5 is accommodated again in the vacuum apparatus or the coupling portion 2 is separated from the vacuum apparatus and coupled with another vacuum apparatus so that the specimen 5 can be accommodated therein.

Thus, the specimen 5 can be transferred between vacuum apparatuses without being exposed to the atmosphere.

However, in order to maintain the degree of vacuum inside the container body 1, it is necessary to constantly operate the vacuum pump 4 during transportation by supplying electric power to the vacuum pump 4 from a power source (not shown) via a power cable 7. Since the power source is normally fixed, this method has a drawback in that the range of movement of the transfer body is restricted within the movable range of the power cable 7.

In addition, there is another drawback in that the transfer device is expensive since a vacuum pump is used.

SUMMARY OF THE INVENTION

Accordingly, an object of the present invention is to provide a transfer device which has excellent transportability and is inexpensive, thereby overcoming the above-described drawbacks of the prior art.

Another object of the present invention is to provide a method of transfer which enables, by the use of the device of the invention, the transportation of a specimen between vacuum apparatuses while being maintained under a high vacuum.

According to one aspect of the present invention, a transfer device comprises a hermetic container for accommodating a specimen removed from a vacuum apparatus and for supporting the specimen and a pressure reducing means for reducing the pressure in the hermetic container by adsorbing a gaseous matter contained therein.

According to another aspect of the present invention, a method of transferring a specimen between vacuum apparatuses comprises the steps of hermetically coupling a hermetic container of a transfer device to a vacuum apparatus in which a specimen is accommodated, removing the specimen from the vacuum apparatus to the interior of the hermetic container, separating the hermetic container from the vacuum apparatus with the hermetic container hermetically closed, hermetically coupling the hermetic container to another vacuum apparatus, and transferring the specimen from the hermetic container into the other vacuum apparatus.

A pressure reducing means used in accordance with the present invention performs evacuation by making an adsorbent such as molecular sieves adsorb gaseous matter and does not require any power supply or power cable.

A transfer device improved in portability can be realized by using such a pressure reducing means instead of a vacuum pump.

DESCRIPTION OF THE PREFERRED EMBODIMENT

Referring now to the accompanying drawings, an embodiment of the invention will now be described.

Figure 1:
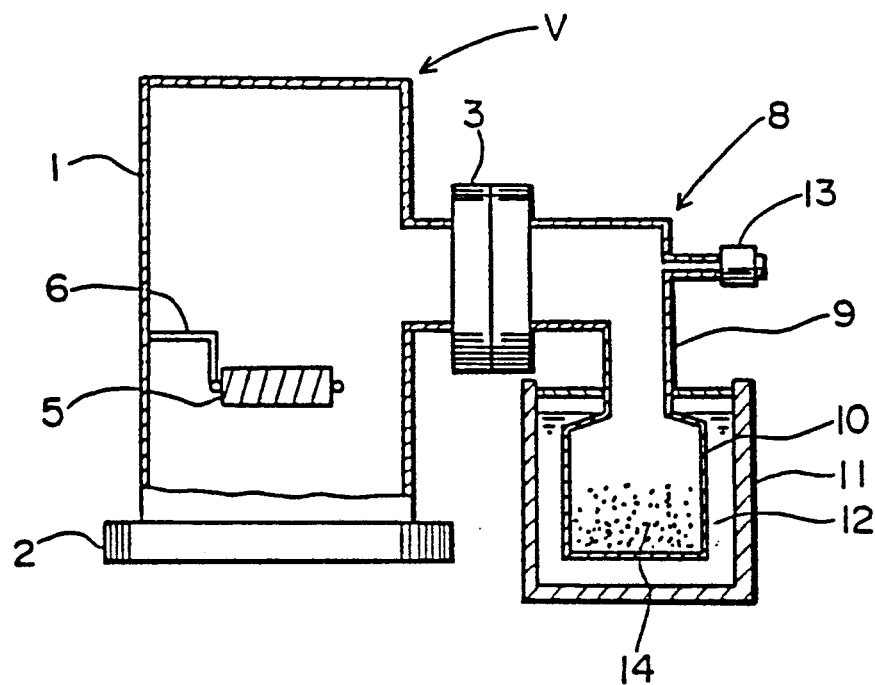
FIG. 1 is a side elevation, partially in section, of a transfer device in accordance with an embodiment of the present invention.
Figure 2:
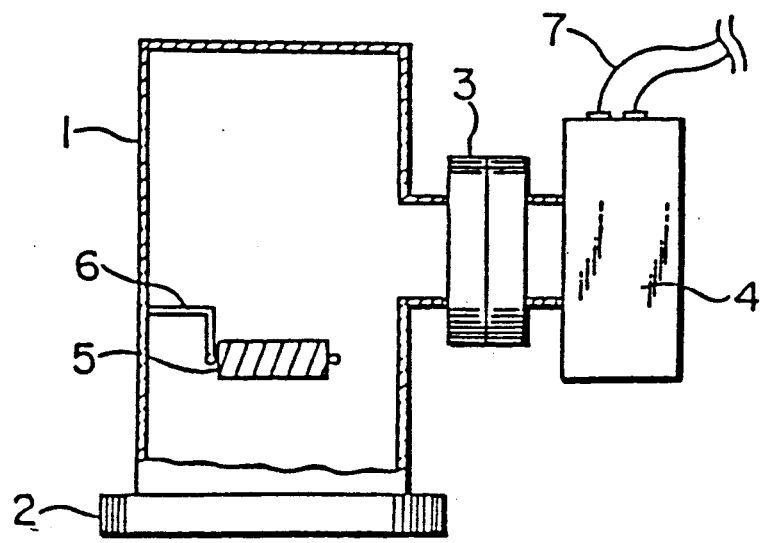
FIG. 2 is a side elevation, partially in section, of a conventional transfer device.

FIG. 1 schematically illustrates a transfer device constructed in accordance with the present invention which has a cylindrical container body 1, one end of which is closed. At the other open end of the container body 1, a coupling portion 2 is provided which is adapted to be selectively opened and closed. The container body 1 and the coupling portion 2 constitute a hermetic container V. Furthermore, a holder 6 for holding a specimen 5 such as a semiconductor device is installed on an inner wall of the container body 1.

A pressure reducing means 8 is hermetically connected to an outer portion of the container body 1 via a connecting portion 3. The pressure reducing means 8 has an adsorbent container chamber 10 which is cylindrical and opened at its top. An L-shaped connection pipe 9 is connected to the upper end of the adsorbent containing chamber 10 and is hermetically connected to the connecting portion 3. The adsorbent containing chamber 10 is accommodated in a heat-insulated container 11. The heat-insulated container 11 is spaced apart from the adsorbent containing chamber 10 to form a gap in which a cooling medium 12 such as liquid nitrogen is contained. A safety valve 13 for releasing pressure is provided in a portion of the connection pipe 9. Artificial zeolite molecular sieves 14 provided as an adsorbent are contained in the adsorbent containing chamber 10.

The operation of this embodiment will be described hereafter.

The hermetic container V is coupled hermetically in advance to a vacuum apparatus (not shown). In this state, the coupling portion 2 is then opened, and the inside of the hermetic container V is evacuated using a vacuum pump or the like so that a higher degree of vacuum is established in the hermetic container V. The specimen 5 is then removed from the inside of the vacuum apparatus and supported by the holder 6 inside the container body 1. Subsequently, the coupling portion 2 is closed.

Thus, the specimen 5 is transferred from the vacuum apparatus into the hermetic container V. At this time, the molecular sieves 14 in the adsorbent containing chamber 10 have already been cooled to a low temperature by the cooling medium 12 in the heat-insulated container 11. In general, adsorbents such as molecular sieves exhibit a high degree of performance in adsorbing components of air at low temperatures and under a low pressures. Therefore, the quantity of air left in the hermetic container V is adsorbed by the molecular sieves 14 in the pressure reducing means 8. In other words, declines in the degree of vacuum inside the hermetic container V are checked, and as a result, a high degree of vacuum is maintained.

Subsequently, the coupling portion 2 is either opened and the specimen 5 is transferred back to the original vacuum apparatus, or the coupling portion 2 is separated from that vacuum apparatus and coupled with another vacuum apparatus so as to effect the transfer of the specimen 5 thereto. In this case, since no vacuum pump is used as in the conventional case, no power cable for connecting a vacuum pump to a power source is needed in this transfer vessel device. Hence, it is possible to freely move the transfer vessel device containing the specimen therein, without being restricted by a power cable.

Thus, the specimen 5 can be transported between vacuum apparatuses can be effected while being maintained under a high vacuum.

The molecular sieves 14 readily release adsorbed water vapor when they are heated. Also, they readily release all other adsorbed gases at room temperature. Therefore, if the adsorbent containing chamber 10 of the pressure reducing means 8 is heated after being taken out of the heat-insulated container 11, the adsorption property of the molecular sieves is adequately recovered. That is, the molecular sieves 14 can be reused. The air separated from the molecular sieves 14 is released to the outside via the safety valve 13 disposed in the wall portion of the connection tube 9.

If the pressure reducing means 8 has a sufficiently high adsorbing performance, the adsorbent containing chamber 10 may be cooled to maintain the desired degree of vacuum by being inserted into the heat-insulated container 11 at predetermined time intervals instead of being constantly cooled by the cooling medium 12.

Figure 3:
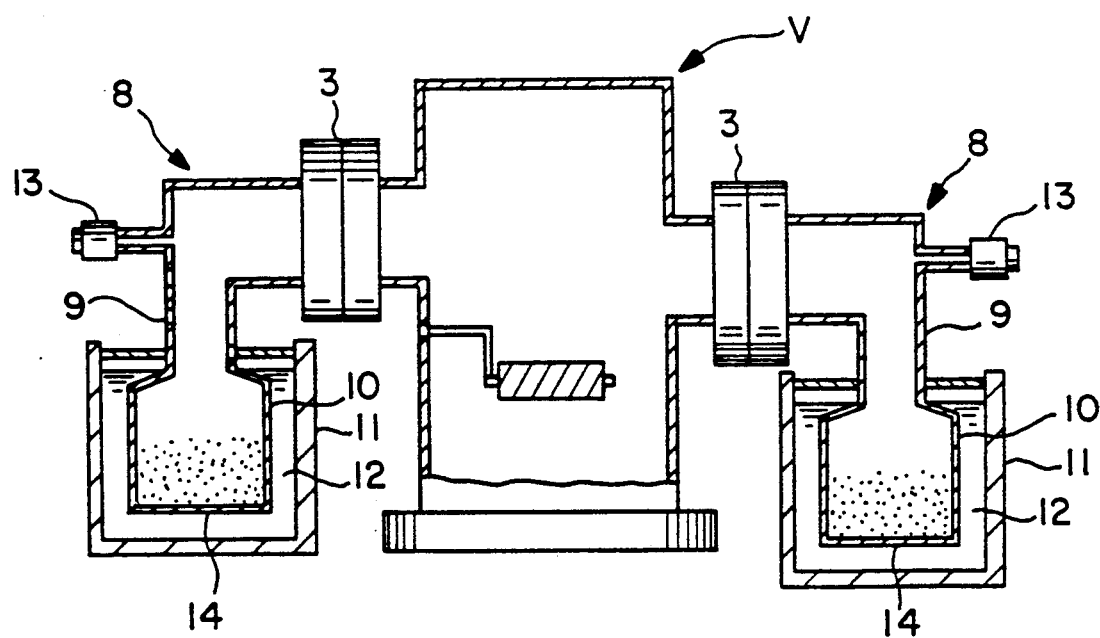
FIG. 3 is a side elevation of another embodiment of the present invention having a plurality of pressure reducing means.

Conversely, if the adsorbing performance of one pressure reducing means 8 is not high enough to maintain the desired degree of vacuum in the hermetic container V, it is effective to provide the hermetic container V with a plurality of connecting portions 3 so that it is connected to a plurality of pressure reducing means 8. FIG. 3 is a side elevation of another embodiment of the present invention in which a plurality of pressure reducing means 8 are connected to a single container body 1 by corresponding connecting portions 3.

The cooling medium 12 contained in the heat-insulated container 11 is not limited to liquid nitrogen, and other cooling mediums, such as liquid air, are also applicable.

If the specimen 5 to be transported has been subjected to a certain kind of processing such as cleavage or thermal or chemical treatment, it is preferable to first place the specimen 5 in the hermetic container V and thereafter evacuate the interior thereof instead of directly placing the specimen 5 in the vacuum apparatus. This procedure ensures that, even if contamination occurs from the specimen 5 during processing, spreading of contamination to the vacuum apparatus can be limited and the vacuum apparatus is protected from contamination. Even if the interior of the hermetic container V is contaminated, it is easy to clean since the capacity thereof is far smaller than the capacity of the vacuum apparatus.

If, as mentioned above, a plurality of pressure reducing means 8 are attached to the hermetic container V, it is possible to clean some of the pressure reducing means 8 while the rest of them are operating, thereby avoiding a reduction in the operation rate.

What is claimed is:

1. A transfer device for transferring an object from a vacuum apparatus comprising:
    a hermetic container;
    a coupling attached to the hermetic container for detachably and hermetically connecting the hermetic container to a vacuum vessel; and
    pressure reducing means for reducing the pressure in said hermetic container by adsorbing gaseous matter,
    said pressure reducing means comprising:
    a first container communicating with the interior of said hermetic container
    an adsorbent disposed in said first container and
    a second container surrounding said first container and containing a cooling medium for cooling said adsorbent through said first container.

2. A transfer vessel device according to claim 1, wherein said adsorbent comprises molecular sieves.

3. A transfer vessel device according to claim 1, wherein said cooling medium comprises liquid nitrogen.

4. A transfer device according to claim 1 wherein said hermetic container and said pressure reducing means are secured to each other.

5. A transfer device according to claim 4, wherein the integral connection of said hermetic container and said pressure reducing means is effected further comprising a connecting portion hermetically connecting said hermetic container and said pressure reducing means.

6. A transfer device according to claim 1 wherein said coupling includes means for selectively opening and closing said transfer vessel.

7. A portable transfer device for transferring an object from a vacuum apparatus comprising:
    a hermetic transfer vessel having an opening for introducing an object;
    a coupling mounted on the opening of the transfer vessel for detachably connecting the transfer vessel to a vacuum apparatus, the coupling being capable of being opened to allow the passage of an object and being closable to hermetically seal the opening when the transfer vessel is detached from a vacuum apparatus;

an adsorbing chamber which is secured to an communicates with the inside of the transfer vessel; and an adsorbent for gas disposed inside the adsorbing chamber.

8. An apparatus as claimed in claim 7 further comprising a connector for detachably and hermetically connecting the adsorbing chamber to the transfer vessel.

9. An apparatus as claimed in claim 7 further comprising a heat-insulating container disposed around the adsorbing chamber and a liquid coolant disposed inside the heat-insulating container.

10. An apparatus as claimed in claim 9 wherein the adsorbing chamber is constructed so as to be removably inserted into the heat-insulating container.

11. A portable transfer device for transferring an object from a vacuum apparatus comprising:

a hermetic transfer vessel having a first opening for introducing an object and a second opening through which gas can pass;

a coupling mounted on the first opening of the transfer vessel for detachably connecting the transfer vessel to a vacuum apparatus, the coupling being capable of being opened to allow the passage of an object and being closable to hermetically seal the first opening when the transfer vessel is detached from a vacuum apparatus;

a plurality of adsorbing chambers containing an adsorbent for gas; and a plurality of connectors, each of which detachably connects a corresponding one of the adsorbing chambers to the inside of the transfer vessel via the second opening, each of the connectors being capable of being opened to allow the flow of gas between the transfer vessel and the corresponding adsorbing chamber and closed to hermetically seal the transfer vessel from the corresponding adsorbing chamber independently of the other connectors.

* * * * *